(12) United States Patent
Yong et al.

(10) Patent No.: US 12,291,266 B2
(45) Date of Patent: May 6, 2025

(54) VEHICLE LOWER BODY

(71) Applicants: Hyundai Motor Company, Seoul (KR); Kia Corporation, Seoul (KR)

(72) Inventors: Ji Ae Yong, Hwaseong-si (KR); Seok Ju Gim, Seongnam-si (KR); Hyung Gyu Park, Anyang-si (KR); Ho Yeon Kim, Daegu (KR); Sun Hyung Cho, Suwon-si (KR); Chul Hee Heo, Hwaseong-si (KR); Won Oh Kim, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 296 days.

(21) Appl. No.: 17/948,491

(22) Filed: Sep. 20, 2022

(65) Prior Publication Data

US 2023/0174155 A1    Jun. 8, 2023

(30) Foreign Application Priority Data

Dec. 2, 2021   (KR) .................... 10-2021-0171031

(51) Int. Cl.
*B62D 21/02* (2006.01)
*B62D 65/12* (2006.01)

(52) U.S. Cl.
CPC ............. *B62D 21/02* (2013.01); *B62D 65/12* (2013.01)

(58) Field of Classification Search
CPC ...... B62D 65/04; B62D 65/12; B62D 23/005; B62D 21/02; B62D 21/03

(Continued)

(56) References Cited

U.S. PATENT DOCUMENTS 5,634,663 A * 6/1997 Krupp .................... B62D 21/02
                                                                      296/29
5,882,064 A * 3/1999 Emmons ................ B62D 23/00
                                                                      296/193.04

(Continued)

FOREIGN PATENT DOCUMENTS

CN       112429116 A  *  3/2021  ........... B62D 63/025
CN       117864245 A  *  4/2024

(Continued)

OTHER PUBLICATIONS

Shioya et al. (JP 2021003940 A), machine translation (Year: 2021).*

(Continued)

*Primary Examiner* — Amy R Weisberg
*Assistant Examiner* — Wenwei Zhuo
(74) *Attorney, Agent, or Firm* — Slater Matsil, LLP

(57) ABSTRACT

An embodiment vehicle lower body includes a front lower body and a rear lower body spaced apart from each other in a longitudinal direction, each including multiple pipes and having wheels and a suspension mounted thereto, a pair of lower body main members each having a pipe shape and spaced apart from each other in a lateral direction, the pair of lower body main members connecting upper end sides of the front lower body and the rear lower body and extending in the longitudinal direction to define upper side members of the front lower body and the rear lower body, and a pair of lower body floor members each having a pipe shape and spaced apart from each other in the lateral direction, the pair of lower body floor members connecting lower end sides of the front lower body and the rear lower body.

17 Claims, 5 Drawing Sheets

(58) Field of Classification Search
USPC .......... 296/193.08, 193.09, 203.01, 205, 204
See application file for complete search history.

(56) References Cited

U.S. PATENT DOCUMENTS

| | | | | |
|---|---|---|---|---|
| 8,857,853 | B2* | 10/2014 | Lin ........................ | B62D 21/12 |
| | | | | 280/124.109 |
| 2007/0126200 | A1* | 6/2007 | Ogawa ..................... | B60G 7/00 |
| | | | | 280/124.128 |
| 2011/0121554 | A1* | 5/2011 | Olson .................... | B62D 21/20 |
| | | | | 280/781 |
| 2023/0174161 | A1 | 6/2023 | Kim et al. | |

FOREIGN PATENT DOCUMENTS

| | | | | | |
|---|---|---|---|---|---|
| JP | 2021003940 | A | * | 1/2021 | ............... B60K 1/04 |
| KR | 20210083533 | A | | 7/2021 | |
| KR | 20230083001 | A | | 6/2023 | |

OTHER PUBLICATIONS

Liu et al. (CN 112429116 A), machine translation (Year: 2021).*
CN_112429116_A_I machine translation and annotated figures (Year: 2021).*

* cited by examiner

VEHICLE LOWER BODY

CROSS-REFERENCE TO RELATED APPLICATIONS

This application claims the benefit of Korean Patent Application No. 10-2021-0171031, filed on Dec. 2, 2021, which application is hereby incorporated herein by reference.

TECHNICAL FIELD

The disclosure relates to a technology regarding a vehicle lower body.

BACKGROUND

Conventional chassis structures have shortcomings in that investment is necessary in large-scale facilities such as a press factory, a chassis welding factory, and a painting factory because chassis are produced by processing and welding components through press processing that uses molds, and the degree of freedom is low in connection with design.

Particularly, existing chassis require frequent design changes when multiple types are produced in small amounts, and the number of necessary molds increases exponentially, thereby posing a problem of increased production costs.

It has recently become necessary to simplify vehicle production and to minimize the development period in order to respond to rapidly changing market environments and customer needs in a timely manner.

Therefore, there is a need for a chassis structure which can respond to various designs, and which has improved chassis assembly characteristics in a smart factory environment.

In addition, there is a need for a vehicle capable of transporting cargo without a driver in the vehicle in line with recent development of autonomous driving technologies, and there is a need for a vehicle which can be manufactured in an eco-friendly smart factory, wherein when the autonomous driving vehicle requiring no driver is manufactured, some components are modularized to reduce costs and to simplify manufacturing, and the chassis is assembled solely by mechanically assembling the modularized vehicle components, such as bolting, without going through a press process, a chassis welding process, and a painting process.

The above descriptions regarding background technologies have been made only to help understanding of the background of the disclosure, and are not to be deemed by those skilled in the art to correspond to already known prior art.

SUMMARY

The disclosure relates to a technology regarding a vehicle lower body. Particular embodiments relate to a technology regarding the chassis structure of a vehicle driven for a purpose such as cargo transportation, mobile market, or the like. Embodiments relate to a chassis frame structure for simplifying vehicle manufacturing.

Embodiments of the disclosure can solve problems in the art, and an embodiment of the disclosure provide an unmanned transportation vehicle wherein multiple pipes are used to assembly the lower body of the vehicle, and the same is conveniently assembled by bolting coupling.

A vehicle lower body according to an embodiment of the disclosure is a vehicle lower body configured through multiple pipes and having an upper body assembled to an upper part thereof, the vehicle lower body including a front lower body and a rear lower body which are configured through multiple pipes and to which a wheel and a suspension of a vehicle are mounted, a pair of lower body main members configured to have a pipe shape, connecting both upper end sides of the front lower body and the rear lower body spaced apart from each other, and extending frontward and backward, respectively, to constitute upper side members of the front lower body and the rear lower body together, and a pair of lower body floor members configured to have a pipe shape and connecting both lower end sides of the front lower body and the rear lower body spaced apart from each other.

The lower body main member and the lower body floor member may be formed of a beam having a closed sectional shape.

The vehicle lower body may further include a pair of lower body lateral members extending in the vertical direction and connected to lateral sides of the lower body main member and the lower body floor member.

The lower body lateral members may be formed to have sections open to vehicle outsides and connect the lower body main member and the lower body floor member by bolt coupling.

The vehicle lower body may further include a lower body assisting member extending in the lateral direction of a vehicle and connecting a pair of lower body floor members spaced apart from each other in the lateral direction of the vehicle.

The lower body assisting member may be formed to have a section open to a lower side of a vehicle and may connect the pair of the lower body floor members by bolt coupling.

The front lower body and the rear lower body may be arranged symmetrically and spaced apart from each other in the forward/backward direction of a vehicle in the same shape.

The front lower body and the rear lower body having the same shape may include a back beam extending in the leftward/rightward direction of a vehicle, an end module coupled to the rear side of the back beam, and a mounting module connected to the end module and having a wheel and a suspension mounted thereto.

The end module may be formed to have a trapezoid shape in which multiple end module lateral members extending in the lateral direction of a vehicle and spaced apart from each other in the vertical direction are connected by the multiple end module connection members extending in the vertical direction of a vehicle.

The mounting module may include multiple mounting module longitudinal members extending in the longitudinal direction to be connected to the end module and spaced apart from each other in the vertical direction and lateral direction, mounting module connection members extending in the vertical direction to connect the multiple mounting module longitudinal members spaced apart from each other in the vertical direction, mounting module lateral members extending in the lateral direction to connect the multiple mounting module longitudinal members spaced apart from each other in the lateral direction, and a suspension mounting part to which a suspension is connected.

The front lower body, the rear lower body, the lower body main member, and the lower body floor member may be coupled to each other by bolting or riveting.

The front lower body, the rear lower body, the lower body main member, or the lower body floor member formed of multiple pipes may have an open-end part, and may further include an end patch coupled to close the end part so as to couple multiple pipes, and the end patch may be spaced apart inward from the end part of the front lower body, the rear lower body, the lower body main member, or the lower body floor member and weld-coupled thereto, and a bead generated by welding may be positioned in a separation space formed by the end patch being spaced toward the inside the front lower body, the rear lower body, the lower body main member, or the lower body floor member.

A vehicle lower body according to embodiments of the disclosure is advantageous in that the same includes multiple pipes, which are fastened by bolting or riveting, thereby reducing costs, the same is designed for easy coupling or disassembling such that, when damaged, the same can be easily repaired, and the same is easily replaceable with another component.

In addition, the vehicle lower body according to embodiments of the disclosure is advantageous in that the same is applicable to various vehicles required by customers by adjusting the length of a lower body floor member and a lower body main member connecting a front lower body and a rear lower body, thereby reducing costs for manufacturing and designing.

BRIEF DESCRIPTION OF THE DRAWINGS

The above and other aspects, features and advantages of embodiments of the disclosure will be more apparent from the following detailed description taken in conjunction with the accompanying drawings, in which.

DETAILED DESCRIPTION OF ILLUSTRATIVE EMBODIMENTS

Figure 1:
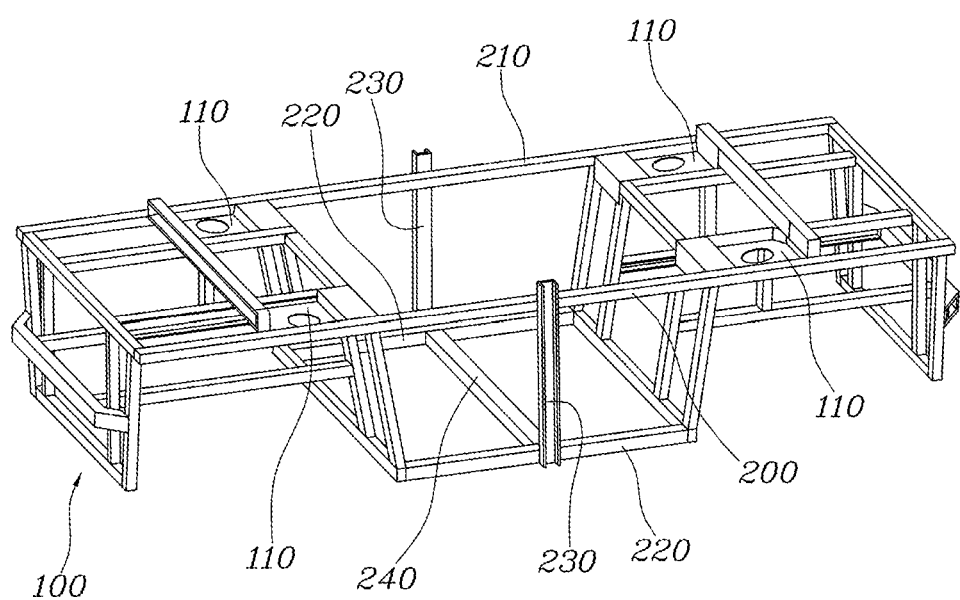
FIG. 1 is a perspective view illustrating a vehicle lower body according to an embodiment of the disclosure.

A specific structural or functional description of embodiments of the present disclosure set forth in the specification or application is given merely for the purpose of describing the embodiments according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a first element without departing from the scope of protection of the present disclosure.

In the case where an element is referred to as being "connected" or "coupled" to other elements, it should be understood that not only the element is directly connected or coupled to the other elements, but also another element may exist between them. Contrarily, in the case where a component is referred to as being "directly connected" or "directly coupled" to any other component, it should be understood that there is no component therebetween. The other expressions for describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless it is definitely different in a context. As used herein, the expression "include" or "have" is intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. Similar or like reference signs presented in the respective drawings designate similar or like elements.

Passengers ride in a conventional vehicle, and a relatively long manufacturing process and a relatively high manufacturing cost are required to provide all of a vehicle suspension, an exterior, an interior, a steering device, a safety device, and the like in a vehicle in consideration of ride comfort, safety specifications, aesthetics, and driving performance for the passengers. In addition, there was a problem in that it was not possible to create a custom-made vehicle for every purpose because each vehicle had to be manufactured individually for each purpose.

A vehicle to which a technology according to embodiments of the disclosure is applied is a purpose built vehicle (PBV) which is a business vehicle having various commercial purposes such as logistics, a food truck, delivery, and service provision. A representative case of embodiments described herein shows a vehicle which may travel to transport cargo loaded in an inner space thereof with no passengers on board, be driven through autonomous driving systems, and be used for unmanned delivery/logistics/delivery systems such as cargoes or food therethrough.

As the structure of the vehicle according to embodiments of the disclosure becomes simpler, the design and manufacturing thereof may be simplified. The vehicle has the advantage in that parts of the vehicle are modularized and shared so that manufacturing cost is reduced, supply of parts is facilitated, and a vehicle is completed only by mechanical bonding, such as bolting or riveting, of modularized vehicle pails through an environment-friendly smart factory production process without a press process, body welding process, and painting process.

Embodiments of the disclosure relate to a method for simplifying a manufacturing process and maximally excluding welding processes and manufacturing a car body through multiple pipes in order to reduce manufacturing cost for car body members. However, though pipes may have an advantage of low cost because they are manufactured through extrusion, roll forming, or the like, reinforcement of coupling strength is required for coupling between pipes or between a pipe and another panel. Accordingly, in embodiments of the disclosure, a coupling member for sealing an open-end of a pipe is employed for strong coupling between an end part of a pipe and another pipe or panel, deformation of the open-end part of a pipe is suppressed through the coupling member, and a coupling surface is provided for coupling to another configuration. A specific configuration of the coupling member will be described later. According to the structure of embodiments of the disclosure, in which the pipe and the coupling member are integrated, there are advantages in that a car body may be easily assembled only through mechanical coupling such as bolting and riveting in an environment friendly smart factory, a partial member of the car body may be easily replaced in case of accident or maintenance, it is environment-friendly as it does not require welding and the like, and various kinds of vehicles are easily assembled and manufactured.

The vehicle to which embodiments of the disclosure are applied may be divided into a business area positioned at an upper part of the vehicle and having a cargo loaded thereon and a drive area positioned at a lower part and responsible for driving the vehicle, and the business area may be variously changed according to a customer's demand and the drive area may be variously changed according to driving conditions of the vehicle.

The vehicle according to an embodiment is designed to have a structure in which a door is unidirectionally opened to open a space for loading a cargo and the business area may be designed in various shapes according to a customer's demand.

The vehicle lower body of the disclosure includes a car body positioned in a drive area of a vehicle for the unmanned delivery system.

Figure 2:
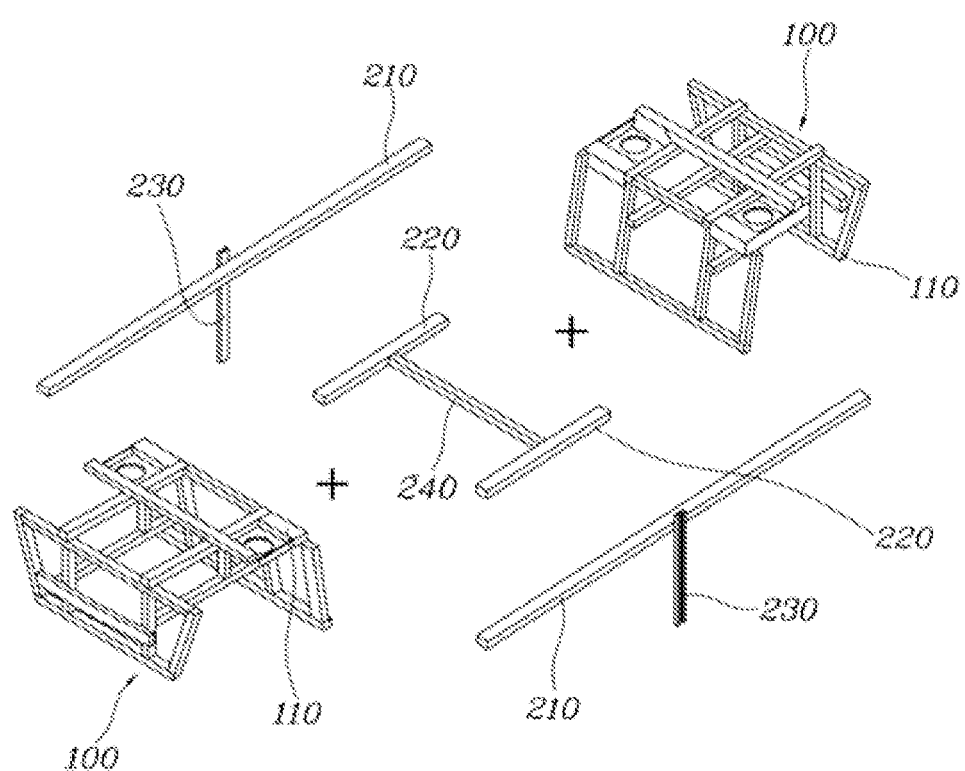
FIG. 2 is an exploded perspective view illustrating a vehicle lower body according to an embodiment of the disclosure.
Figure 3:
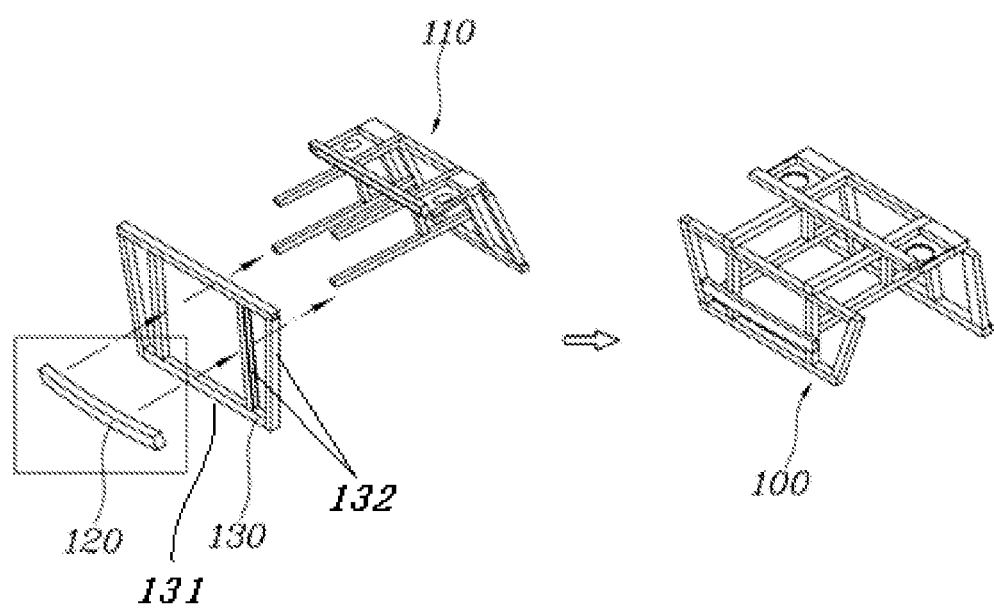
FIG. 3 is an exploded perspective view illustrating a front lower body and a rear lower body of a vehicle lower body according to an embodiment of the disclosure.
Figure 4:
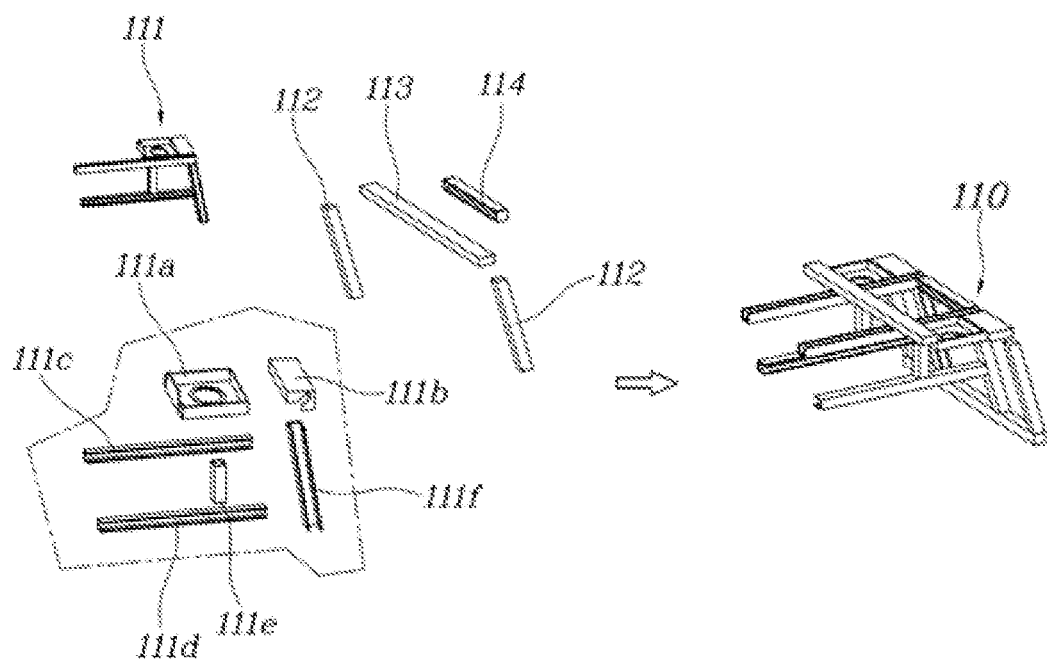
FIG. 4 is an exploded perspective view illustrating a mounting module included in a front lower body and a rear lower body of a vehicle lower body according to an embodiment of the disclosure.

FIG. 1 is a perspective view illustrating a vehicle lower body according to an embodiment of the disclosure, FIG. 2 is an exploded perspective view illustrating a vehicle lower body according to an embodiment of the disclosure, FIG. 3 is an exploded perspective view illustrating a front lower body and a rear lower body of a vehicle lower body according to an embodiment of the disclosure, and FIG. 4 is an exploded perspective view illustrating a mounting module included in the front lower body and the rear lower body of a vehicle lower body according to an embodiment of the disclosure.

A vehicle lower body according to embodiments of the disclosure will be described with reference to FIG. 1 to FIG. 5.

The vehicle lower body according to embodiments of the disclosure is a vehicle lower body configured through multiple pipes and having an upper body assembled to the upper part thereof, and more specifically, a vehicle lower body configured through multiple pipes and including a rear lower body 100 and a front lower body 100 to which a wheel and a suspension of a vehicle are mounted, a pair of lower body main members 210 having a pipe shape and configured to connect both upper end sides of the front lower body 100 and the rear lower body 100 spaced apart from each other and extend forward and backward, respectively, to define upper side members of the front lower body 100 and the rear lower body 100 together, and a pair of lower body floor members 220 having a pipe shape and configured to connect both lower end sides of the front lower body 100 and the rear lower body 100 spaced apart from each other.

As shown in FIG. 1 and FIG. 2, the front lower body 100, the rear lower body 100, the lower body main member 210, and the lower body floor member 220 of the vehicle lower body may be configured through multiple pipes and connected to each other.

Through this, unlike a conventional car body of a vehicle, a press process among car body processes may be omitted and thus manufacturing cost may be reduced.

The front lower body 100 and the rear lower body 100 are disposed at the front and the rear of the vehicle respectively so as to absorb impact during a forward collision and a backward collision and may protect the cargo loaded on the upper part.

In addition, a suspension may be mounted to the front lower body 100 and the rear lower body 100 and thus a wheelhouse in which a wheel connected to the suspension is positioned may be formed.

The upper lateral side of the front lower body 100 and the rear lower body 100 may be formed not to be coupled to a member, and the lower body main member 210 includes a pipe extending in the longitudinal direction of the vehicle to be coupled to the upper lateral side of the front lower body 100 and the upper lateral side of the rear lower body 100 so that the lower body main member 210 extends from the front to the rear of the vehicle and connects the front lower body 100 and the rear lower body 100 spaced apart from each other.

In addition, the lower body floor member 220 may reinforce the coupling of the front lower body 100 and the rear lower body 100 by connecting the lower parts of the front lower body 100 and the rear lower body 100 in a state in which the front lower body 100 and the rear lower body 100 are spaced apart in the forward/backward direction of the vehicle and coupled by the lower body main member 210.

Through this, the vehicle lower body is formed of the front lower body 100, the rear lower body 100, the lower body main member 210, and the lower body floor member 220 which are formed of multiple pipes and thus have an advantage of simplifying the manufacturing process and reducing the manufacturing cost.

Furthermore, the lower body main member 210 and the lower body floor member 220 may be variously formed by adjusting the lengths thereof according to the purpose of the vehicle and a customer's demand and thus have an effect of adjusting the whole length of the vehicle and the length of a wheelbase.

The lower body main member 210 and the lower body floor member 220 may be formed of a beam having a closed section.

The lower body main member 210 and the lower body floor member 220 for connecting the front lower body 100 and the rear lower body 100 spaced apart from each other may require higher stiffness than the pipe forming the front lower body 100 and the rear lower body 100.

Through this, the pipe forming the lower body main member 210 and the lower body floor member 220 is formed of a pipe having a closed section and extending in the longitudinal direction to connect the front lower body 100 and the rear lower body 100, and thus may absorb impact during a lateral collision, protect loaded cargo from a lateral collision, and support the load of the loaded cargo.

A pair of lower body lateral members 230 extending in the vertical direction and connected to the lateral side of the lower body main member 210 and the lower body floor member 220 may be further included.

As shown in FIG. 1 and FIG. 2, the lower body lateral member 230 may extend on a lateral side of the vehicle in the vertical direction and may have both end parts connected to the lower body main member 210 and the lower body floor member 220, respectively.

Through this, the lower body lateral member 230 may give effects of reinforcing the coupling by connecting the lower body main member 210 and the lower body floor member 220 which connect the front lower body 100 and the rear lower body 100, supporting the load of cargo loaded on the upper part of the lower body main member 210 and the lower body floor member 220 by extending in the vertical direction, and additionally absorbing the impact when a collision occurs on the lateral side.

The lower body lateral member 230 may be formed to have a section open to the vehicle outside and may connect the lower body main member 210 and the lower body floor member 220 by bolt coupling.

As shown in FIG. 2, the lower body lateral member 230 may be formed of a pipe formed to have an open section of which an external side is open and extending in the longitudinal direction, and the open lateral side surface may be disposed on a lateral side of the vehicle.

Through this, a bolt or rivet may be inserted through an opened surface and a tool for coupling the bolt or rivet may be inserted together with the same, and thus the lower body lateral member 230 may be easily coupled to the lower body main member 210 and the lower body floor member 220.

In addition, the manufacturing by using an open sectional pipe may lead to the reduction in the weight so as to give an effect of reducing an empty vehicle weight of a car body, and the manufacturing of the open section by using a panel press molding not an extrusion molding may give an effect of reducing the manufacturing cost.

The arrangement of an open part outside may give an effect of protecting a car body during a lateral collision according to the lower body lateral member 230 extending outside by the thickness of the pipe from a portion coupled to the lower body main member 210 and the lower body floor member 220.

A lower body assisting member 240 extending in the lateral direction of the vehicle and connecting a pair of lower body floor members 220 spaced apart from each other in the lateral direction of the vehicle may be further included.

As shown in FIG. 2, a pair of lower body floor members 220 are arranged on the lower part of the vehicle to connect the front lower body 100 and the rear lower body 100, and the lower body assisting member 240 may be provided to connect the pair of lower body floor members 220 spaced apart from each other in the lateral direction of the vehicle.

Through this, the stiffness between the lower body floor members 220 may be enhanced and the lower body assisting member 240 may disperse the impact when a lateral collision occurs so as to reduce damage to the vehicle and thus give an effect of protecting loaded cargo.

The lower body assisting member 240 may be formed to have a section open to the vehicle outside and may connect a pair of the lower body floor members 220 by bolt coupling.

As shown in FIG. 2, the lower body assisting member 240 may be formed of a pipe having an open section of which an external side is open and extending in the longitudinal direction, and the open lateral side surface may be disposed on a lower side of the vehicle.

Through this, a bolt or a rivet may be inserted through an opened surface and a tool for coupling the bolt or the rivet may be inserted together with the same, and thus the lower body assisting member 240 may be easily coupled to a pair of lower body floor members 220.

In addition, manufacturing by using an open sectional pipe may lead to the reduction in the weight so as to give an effect of reducing an empty vehicle weight of a car body, and manufacturing the open section by using a panel press molding not an extrusion molding may give an effect of reducing the manufacturing cost.

The front lower body 100 and the rear lower body 100 may be arranged symmetrically and spaced apart from each other in the forward/backward direction of the vehicle in the same shape.

As shown in FIG. 1 and FIG. 2, the front lower body 100 and the rear lower body 100 may be the same part and arranged to be symmetrical in the forward/backward direction with reference to the center of the vehicle so as to be connected to each other by the lower body main member 210 and the lower body floor member 220.

Through this, the use of the same part for the front lower body 100 and the rear lower body 100 may give an effect of reducing the cost and simplifying the manufacturing process.

The front lower body 100 and the rear lower body 100 having the same shape may include a back beam 120 extending in the leftward/rightward (i.e., lateral) direction of the vehicle, an end module 130 coupled to the rear side of the back beam 120, and a mounting module no connected to the end module 130 and having a wheel and a suspension mounted thereto.

As shown in FIG. 3, the front lower body 100 and the rear lower body 100 having the same shape are arranged on the external side of the vehicle, the back beam 120 extending in the lateral direction of the vehicle is provided, and the end module 130 coupled to the rear side of the back beam 120 and forming the front or the rear of the vehicle is provided.

Through this, there are effects that the impact during a front collision may be absorbed by the back beam 120 and the end module 130 formed of a pipe and the cargo loaded in the vehicle may be protected.

In addition, the mounting module no may be disposed on the front lower body 100 and the rear lower body 100 to extend from the end module 130 to the center of the vehicle so as to be coupled thereto, and a suspension connected to a wheel may be mounted to the mounting module 110.

Through this, a wheelhouse in which a wheel connected to a suspension is disposed may be formed on the lateral side between the end module 130 and the mounting module 110.

The end module 130 may be formed to have a trapezoid shape in which multiple end module lateral members 131 extending in the lateral direction of the vehicle and spaced apart from each other in the vertical direction are connected by multiple end module connection members 132 extending in the vertical direction of the vehicle.

As shown in FIG. 3, the end module 130 may be formed to have a trapezoid shape so as to form the front or the rear of the vehicle, and for this end, multiple end module lateral members 131 extending in the lateral direction may be arranged to be spaced apart in the vertical direction and the end module connection members 132 extending in the vertical direction may be provided to connect the end module lateral members 131 and spaced apart in the lateral direction.

In addition, multiple end module connection members 132 may enhance the stiffness of the end module 130, and the end module connection members 132 and the end module lateral members 131 are coupled to each other through a welding or a mechanical coupling such as bolting and riveting.

The mounting module no may include multiple mounting module longitudinal members 114 extending in the longitudinal direction to be connected to the end module 130 and spaced apart from each other in the vertical direction and lateral direction, mounting module connection members 112 extending in the vertical direction to connect the multiple mounting module longitudinal members 114 spaced apart from each other in the vertical direction, mounting module lateral members 113 extending in the lateral direction to connect the multiple mounting module longitudinal members 114 spaced apart from each other in the lateral direction, and a suspension mounting part 111 to which a suspension is connected.

The mounting module longitudinal members 114 are connected to the end module 130 and extend in the longitudinal direction, the mounting module lateral members 113 and the mounting module connection members 112 connect the mounting module longitudinal members 114 to form a frame of the mounting module 110. The suspension mounting part iii of the mounting module no may be connected to a flat surface in which the mounting module longitudinal members 114 and the mounting module lateral members 113 are connected and may have a suspension mounted thereto and a wheel connected thereto.

In addition, the size of the wheelhouse of the vehicle may be determined according to adjustment of the length of the mounting module longitudinal members 114 and the length of the mounting module connection member, and the wheelhouse of the vehicle may be formed according to the adjustment of the length.

Furthermore, the width of the vehicle may be determined by the length of the mounting module lateral members 113 and the end module lateral members 131, and the width of the vehicle may be easily changed by adjusting the length of the mounting module lateral members 113 and the end module lateral members 131 having a pipe shape.

The suspension mounting part 111 may be formed of multiple parts 111a, 111b, 111c, 111d, 111e, and 111f.

The front lower body 100, the rear lower body 100, the lower body main member 210, and the lower body floor member 220 are coupled to each other by bolting or riveting.

Each part of the front lower body 100, the rear lower body 100, the lower body main member 210, and the lower body floor member 220 may be separately modularized in a manufacturing factory, and as shown in FIG. 2, the manufacturing of modularized parts may be completed in a smart factory through a simple mechanical coupling method such as bolt coupling or rivet coupling.

Through this, a vehicle may be completed by coupling all the modularized parts in a smart factory provided in a city area, and thus the modification of a vehicle may be simply achieved according to a customer's demand.

The front lower body 100, the rear lower body 100, the lower body main member 210, or the lower body floor member 220 may be formed of multiple pipes, have an open-end part, and further include an end patch 20 coupled to close the end part so as to couple multiple pipes. The end patch 20 may be spaced apart inward from the end part of the front lower body 100, the rear lower body 100, the lower body main member 210, or the lower body floor member 220 and weld-coupled thereto, and beads generated by welding may be positioned in a separation space formed by the end patch being spaced toward the inside the front lower body 100, the rear lower body 100, the lower body main member 210, or the lower body floor member 220.

Figure 5:
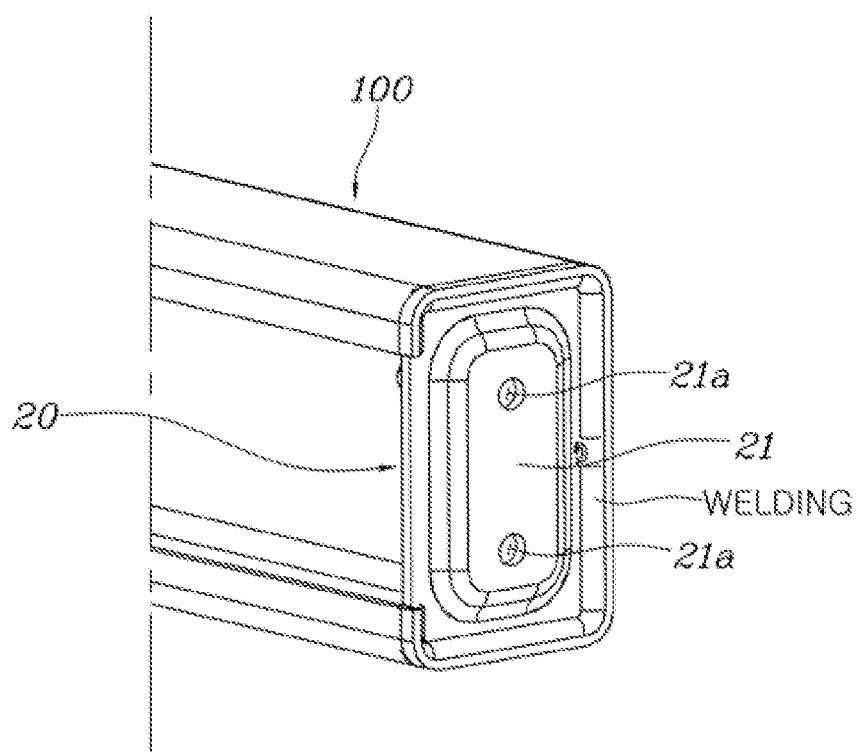
FIG. 5 is a perspective view illustrating an end patch attached to an end of a front lower body and a rear lower body of a vehicle lower body according to an embodiment of the disclosure.

FIG. 5 is a perspective view illustrating the end patch 20 attached to the front lower body 100 and the rear lower body 100 according to an embodiment of the disclosure.

As shown in FIG. 5, the end patch may be coupled to the end part of the pipe of the front lower body 100 and the rear lower body 100, and although not shown in the drawing, the end patch may be coupled to the end part of the lower body main member 210 or the lower body floor member 220 so as to give an effect that when the lower bodies of the vehicle are coupled to each other by bolting or riveting, the fastening may be simply performed.

In addition, as the end patch 20 is weld-coupled in a state of being spaced apart inward from the end part of the front lower body 100, the rear lower body 100, the lower body main member 210, or the lower body floor member 220 and weld beads are positioned in the separation space, the trimming operation of the weld beads becomes unnecessary and there is an effect that the manufacturing operation may be simplified compared to the manufacturing process in the prior art, in which the manufacturing is performed through bending and welding the end part of a pipe and trimming weld beads after welding.

Furthermore, a coupling part 21 formed on the end patch 20 protrudes further than the end part of the pipe to be coupled to another pipe, thus giving an effect of minimizing vibration or noise incurred at a coupling region.

A through-hole 21a is formed through the coupling part 21 to allow mechanical coupling including bolting or riveting coupling when coupled to another pipe, and through this, a car body may be simply completed by coupling multiple pipes in a smart factory, thus achieving an effect of reducing manufacturing cost and simplifying manufacturing processes according thereto.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle lower body comprising:
 a front lower body and a rear lower body spaced apart from each other in a longitudinal direction, each lower body comprising multiple pipes and having wheels and a suspension mounted thereto;
 a pair of lower body main members each having a pipe shape and spaced apart from each other in a lateral direction, the pair of lower body main members connecting upper end sides of the front lower body and the rear lower body and extending in the longitudinal direction to define upper side members of the front lower body and the rear lower body; and
 a pair of lower body floor members that each have a pipe shape and spaced apart from each other in the lateral direction, the pair of lower body floor members connecting lower end sides of the front lower body and the rear lower body;

wherein the front lower body and the rear lower body have a same shape, are arranged symmetrically, and are spaced apart from each other in the longitudinal direction;

wherein each of the front lower body and the rear lower body comprises:
a back beam extending in the lateral direction;
an end module coupled to a rear side of the back beam; and
a mounting module connected to the end module and having the wheels and the suspension mounted thereto; and wherein the end module has a trapezoid shape defined by multiple end module lateral members extending in the lateral direction and spaced apart from each other in a vertical direction connected by multiple end module connection members extending in the vertical direction.

2. A vehicle lower body comprising:
a front lower body and a rear lower body spaced apart from each other in a longitudinal direction, each lower body comprising multiple pipes and having wheels and a suspension mounted thereto;
a pair of lower body main members each having a pipe shape and spaced apart from each other in a lateral direction, the pair of lower body main members connecting upper end sides of the front lower body and the rear lower body and extending in the longitudinal direction to define upper side members of the front lower body and the rear lower body; and
a pair of lower body floor members that each have a pipe shape and spaced apart from each other in the lateral direction, the pair of lower body floor members connecting lower end sides of the front lower body and the rear lower body;
wherein the front lower body and the rear lower body have a same shape, are arranged symmetrically, and are spaced apart from each other in the longitudinal direction;
wherein each of the front lower body and the rear lower body comprises:
a back beam extending in the lateral direction;
an end module coupled to a rear side of the back beam; and
a mounting module connected to the end module and having the wheels and the suspension mounted thereto;
wherein the end module has a trapezoid shape defined by multiple end module lateral members extending in the lateral direction and spaced apart from each other in a vertical direction connected by multiple end module connection members extending in the vertical direction; and
wherein the lower body main members and the lower body floor members comprise a beam having a closed sectional shape.

3. The vehicle lower body of claim 1, further comprising a pair of lower body lateral members extending in the vertical direction and connected to lateral sides of the lower body main members and the lower body floor members.

4. The vehicle lower body of claim 3, wherein the lower body lateral members comprise sections open to an outside of the vehicle lower body and connect the lower body main members and the lower body floor members by bolt coupling.

5. The vehicle lower body of claim 1, further comprising a lower body assisting member extending in the lateral direction and connecting the pair of lower body floor members to each other.

6. The vehicle lower body of claim 5, wherein the lower body assisting member has a section open to a lower side of the vehicle lower body and is connected to the pair of lower body floor members by bolt coupling.

7. The vehicle lower body of claim 1, wherein the front lower body, the rear lower body, the lower body main members, and the lower body floor members are coupled to each other by bolting or riveting.

8. A vehicle body comprising:
a front lower body and a rear lower body spaced apart from each other in a longitudinal direction, each comprising multiple pipes;
a pair of lower body main members each having a pipe shape and spaced apart from each other in a lateral direction, the pair of lower body main members connecting upper end sides of the front lower body and the rear lower body and extending in the longitudinal direction to define upper side members of the front lower body and the rear lower body;
a pair of lower body floor members each having a pipe shape and spaced apart from each other in the lateral direction, the pair of lower body floor members connecting lower end sides of the front lower body and the rear lower body; and
an upper body coupled to an upper part of the front lower body and an upper part of the rear lower body, the upper body comprising multiple pipes,
wherein each of the front lower body and the rear lower body comprises:
a back beam extending in the lateral direction;
an end module coupled to a rear side of the back beam; and
a mounting module connected to the end module and having wheels and a suspension mounted thereto; and
wherein the end module comprises:
multiple end module lateral members extending in the lateral direction and spaced apart from each other in a vertical direction; and
multiple end module connection members extending in the vertical direction and connecting the multiple end module lateral members to define a trapezoidal shape.

9. The vehicle body of claim 8, further comprising a pair of lower body lateral members extending in the vertical direction and connected to lateral sides of the lower body main members and the lower body floor members, wherein the lower body lateral members comprise sections open to an outside of the vehicle body and connect the lower body main members and the lower body floor members by bolt coupling.

10. The vehicle body of claim 8, further comprising a lower body assisting member extending in the lateral direction and connecting the pair of lower body floor members to each other, wherein the lower body assisting member has a section open to a lower side of the vehicle body and is connected to the pair of lower body floor members by bolt coupling.

11. The vehicle body of claim 8, wherein the front lower body and the rear lower body have a same shape, are arranged symmetrically, and are spaced apart from each other in the longitudinal direction.

12. The vehicle lower body of claim 2, further comprising a pair of lower body lateral members extending in the vertical direction and connected to lateral sides of the lower body main members and the lower body floor members.

13. The vehicle lower body of claim 12, wherein the lower body lateral members comprise sections open to an outside of the vehicle lower body and connect the lower body main members and the lower body floor members by bolt coupling.

14. The vehicle lower body of claim 2, further comprising a lower body assisting member extending in the lateral direction and connecting the pair of lower body floor members to each other.

15. The vehicle lower body of claim 14, wherein the lower body assisting member has a section open to a lower side of the vehicle lower body and is connected to the pair of lower body floor members by bolt coupling.

16. The vehicle lower body of claim 2, wherein the front lower body, the rear lower body, the lower body main members, and the lower body floor members are coupled to each other by bolting or riveting.

17. The vehicle lower body of claim 1, wherein the lower body main members and the lower body floor members comprise a beam having a closed sectional shape.

* * * * *